(12) United States Patent
Bauer et al.

(10) Patent No.: US 7,907,596 B2
(45) Date of Patent: Mar. 15, 2011

(54) VALLEY-FREE SHORTEST PATH METHOD

(75) Inventors: Daniel Nikolaus Bauer, Birmensdorf (CH); Dimitrios Dechouniotis, Patras (GR); Christos-Xenofontas Dimitropoulos, Zurich (CH); Andreas Kind, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 12/325,320

(22) Filed: Dec. 1, 2008

(65) Prior Publication Data

US 2009/0141637 A1 Jun. 4, 2009

(30) Foreign Application Priority Data

Nov. 30, 2007 (EP) .................................... 07121987

(51) Int. Cl.
*H04L 12/28* (2006.01)
(52) U.S. Cl. ........................................................ 370/351
(58) Field of Classification Search .................. 370/351, 370/395.1, 400, 401, 406; 709/238–244, 709/249
See application file for complete search history.

(56) References Cited

U.S. PATENT DOCUMENTS 6,981,055 B1 * 12/2005 Ahuja et al. .................. 709/238
2008/0218519 A1 * 9/2008 Coury et al. .................. 345/440

OTHER PUBLICATIONS

Gao, "On Inferring Autonomous System Relationships in the Internet", IEEE/ACM Transactions on Networking, Dec. 2001.
Subramanian, et al, "Characterizing the Internet Hierarchy from Multiple Vantage Points", Proc. IEEE INFOCOM, Jun. 2002.
Dimitropoulos, et al, "AS Relationships: Inference and Validation", ACM SIGCOMM Computer Communication Review, Jan. 2007.
Dimitropoulos, et al, "Inferring AS relationships: Dead end or lively beginning?", Proceedings of 4th Workshop on Efficient and Experimental Algorithms (WEA '05), May 2005.
Mao, et al, "On AS-level path inference", ACM SIGMETRICS, Jun. 2005.
Gao, et al, "The Extend of AS Path Inflation by Routing Policies", IEEE Global Internet Symposium, Nov. 2002.
Dimitropoulos, et al, "Revisiting Internet AS-level Topology Discovery", Proceedings of Passive and Active Measurements, Mar. 2005.

* cited by examiner

*Primary Examiner* — Dmitry H Levitan
(74) *Attorney, Agent, or Firm* — William Stock; Anne Vachon Dougherty

(57) ABSTRACT

A method of calculating a valley-free shortest path between two autonomous systems having a first graph representing an autonomous system topology and comprising a plurality of nodes and a plurality of links interconnecting the nodes, each link linking a first and a second node of the plurality of nodes. The method comprises generating a second graph using the first graph by: Mapping the nodes of the first graph into the second graph, by representing each node of the first graph by a respective uphill node and a downhill node; mapping each link of the first, second and third relationship type with a plurality of directed links between the uphill and downhill nodes according to the type of relationship. The method further comprises calculating the shortest-path route between two autonomous systems on the second graph, using the shortest-path routing algorithm.

11 Claims, 4 Drawing Sheets

VALLEY-FREE SHORTEST PATH METHOD

TECHNICAL FIELD

The invention relates to a method of calculating a shortest path in an autonomous system topology, to a corresponding computer program element, and to a data processing apparatus.

BACKGROUND AND RELATED ART

An Autonomous system (AS) typically is a network which has a single and clearly defined routing policy, as described in IETF, Network Working Group, RFC 1930. An AS may include a small enterprise network, a university network, a national or an intercontinental Internet service providers (ISP). The Internet e.g. is composed of multiple ASes as being a connection of independent networks varying in size.

Autonomous systems (AS) exchange IP traffic with other ASes according to a hierarchical structure. The interconnection between any two autonomous systems typically falls into one of three categories:

The customer-to-provider category, where an AS customer receives traffic transmitted from the rest or part of the Internet from a larger AS provider;

The peer-to-peer category, where two ASes exchange traffic between themselves and their customers, but do not exchange traffic from or to their providers or other peers; and The sibling-to-sibling category, where two ASes belong to the same organization and exchange IP traffic without any restrictions between their providers, customers, peers or other siblings.

Autonomous systems (AS) relationships have well-defined restrictions on how IP traffic between two ASes is exchanged, including:

In exporting routes to a provider or a peer, an autonomous system advertises its local routes and routes received from customers and siblings ASes only;

In exporting routes to a customer or a sibling, an AS advertises all its routes, including local routes and routes received from all the AS neighbors.

From these restrictions a valley-free routing model is derived as described in Lixin Gao, "On Inferring Autonomous System Relationship in the Internet", in IEEE/ACM Trans on Networking, December 2001, page 5. The valley-free routing model states that any path that is used for routing packets between autonomous systems (AS) of an AS topology is valley-free. A valley-free path is a hierarchical structure and is composed of: an uphill segment of zero or more customer-to-provider or sibling-to-sibling links, followed by zero or one peer-to-peer link, followed by a downhill segment of zero or more provider-to-customer or sibling-to-sibling links.

As a result of the AS relationships between any pair of ASes, the calculation of a valley-free shortest path between any two autonomous systems requires taking into account the restrictions on the IP traffic flow following the valley-free path.

In Z. M. Mao, et. al., "On AS-level path interference", in ACM SIGMETRICS, 2005, page 4, a method for calculating the valley-free shortest path is proposed. The method requires an extended processing time, including an exhaustive search algorithm of $O(V^4)$, wherein V is the number of nodes in a first graph representing an AS topology.

Therefore a way of efficiently calculating a valley-free shortest path between a first and a second autonomous system is desired.

SUMMARY OF THE INVENTION

One aspect of the present invention provides a method of calculating a shortest path between a source and a destination autonomous system in a first graph. The first graph represents an autonomous system topology and comprises a plurality of nodes and a plurality of links interconnecting the nodes, each link linking a first and a second node of the plurality of nodes. Each node represents an autonomous system and each link represents a relationship type between two autonomous systems. The relationship types are one of: at least a first, second or third type of relationship.

According to the first aspect of the invention, the first graph is mapped into a second graph by:

a) Mapping each node of the first graph into an uphill node and a downhill node in the second graph;

b) For each link of the first relationship type between a first and a second node in the first graph, mapping the link to: a first directed link from the first uphill node to the second uphill node, a directed link from the second uphill node to the first downhill node, and a directed link from a second downhill node to a first downhill node;

c) For each link of the second relationship type between a first and a second node in the first graph, mapping the link to: a directed link from the first uphill node to the second downhill node, and a directed link from the second uphill node to the first downhill node;

d) for each link of the third relationship type between a first and a second node in the first graph, mapping the link to: a directed link from the first uphill node to the second uphill node, a directed link from the second uphill node to the first uphill node, a directed link from the first downhill node to the second downhill node, and a direct link from the second downhill node to the first downhill node.

The first uphill node and the first downhill node in the second graph represent the first node in the first graph; the second uphill node and the second downhill node in the second graph represent the second node in the first graph.

Now, the shortest-path route between the source and the destination autonomous system is determined by means of the second graph, using a shortest-path routing algorithm.

As the links in the first graph represent relationship types with underlying meanings and a valley-free path should be determined in such graph, a conventional shortest path algorithm cannot simply be applied to the first graph. For this reason, the first graph representing an autonomous system topology is mapped into the second graph with the benefit that a conventional shortest path algorithm can now be applied to the mapped graph. By this means, the present method represents a method for calculating a shortest valley-free path between any source and destination autonomous system in a autonomous system topology.

The algorithm used to calculate the shortest path in the second graph may be, for example, the Dijkstra algorithm or the Floyd-Warshall algorithm.

In a preferred embodiment, the first relationship type is a customer-to-provider relationship, the second relationship type is a peer-to-peer relationship, and the third relationship type is a sibling-to-sibling relationship.

In graph theory, the nodes are also known as vertices and the links are known as edges.

In a preferred embodiment, a node can have assigned one or more links, wherein each link preferably is assigned to one of the tree relationship types.

In a preferred autonomous system topology, each node may have one or more relationship types with other nodes, and the plurality of nodes may at least partially be linked with each other. A first node may be for example linked to a second node and have customer-to-provider relationship. The same first node may be further linked to a third node and have a peer-to-peer relationship. The first node may be a customer of a second node and, at the same time, it may be a peer of a third node.

The arrangement of directed links between the uphill and downhill nodes in the second graph indicates allowable transitions within the valley-free routing model and according to the relationship type of the link.

The valley-free path preferably is a hierarchical path from the source autonomous system to the destination autonomous system within the autonomous system topology that comprises: starting at the source autonomous system an uphill segment of zero or more customer-to-provider or sibling-to-sibling links, followed by zero or one peer-to-peer link, followed by a downhill segment of zero or more peer-to-peer or sibling-to-sibling links for ending up at the destination autonomous system.

The result of the calculation of the shortest path route on the second graph is obtained by using, for example, the Dijkstra algorithm or the Floyd-Warshall algorithm. The result preferably is de-mapped into the first graph. In another preferred embodiment, all the downhill nodes in the second graph have directed links only to other downhill nodes, thereby restricting the routing according to the valley-free routing model.

In an embodiment of the invention, the method further comprises: evaluating Internet traffic between the source and the destination autonomous system (src, dst) before or after a modification of the autonomous system topology and/or the relationship types between the autonomous systems. Such results can be used for the design of autonomous system topologies.

In a preferred embodiment, the method is executed by means of a computer. The method can preferably be used for routing data packets along the calculated shortest (valley-free) path from the source to the destination autonomous system.

According to another aspect of the invention a computer program element is provided—and preferably stored on a computer usable medium—the computer program element comprising computer readable program means for causing a computer to perform a method according to the invention when said program element is run on said computer.

According to a further aspect of the invention, there is provided a data processing apparatus for determining a shortest path between a source (src) and a destination autonomous system (dst), the apparatus comprising means for storing a first graph (400), the first graph (400) representing an autonomous system topology and comprising a plurality of nodes and a plurality of links, each link (401 ... 408) linking a first and a second node of the plurality of nodes, the nodes representing autonomous systems and the links representing relationship types, the relationship type being one of: a first, second or third type, and means for generating a second graph (500) using the first graph (400) by the steps introduced in connection with the method aspect of the present invention. Finally, there are means provided for determining a shortest-path route between the source (src) and the destination autonomous system (dst) in the second graph (500), using a shortest-path routing algorithm.

Any disclosed embodiment may be combined with one or several of the other embodiments shown and/or described. This is also possible for one or more features of the embodiments.

Any feature of one aspect of the invention may be applied to another aspect of the invention and vice versa.

One of the advantages of the invention is that it can determine a shortest valley-free path between two nodes of an autonomous system topology graph by using a conventional shortest path algorithm without requiring an excessive running time, that otherwise may reach runtimes of $O(V^4)$, wherein V is the number of nodes of the first graph representing an AS topology. The method nicely reduces the complexity of autonomous system relationships by mapping all the elements of the autonomous system topology represented in a first graph into a second graph having directed links thereby indicating only allowable transitions between autonomous systems.

After the mapping process has been completed, there is no further need to use the relationship type of the links as an input parameter to calculate the shortest routing path, nor to record the path taken by the route in order to follow the restrictions of the routing model. The second graph describes all the routing possibilities for any path according the valley-free routing model.

BRIEF DESCRIPTION OF THE DRAWINGS

In the following preferred embodiments of the invention are described in greater detail by way of example only making reference to the drawings in which.

DETAILED DESCRIPTION

Figure 1:
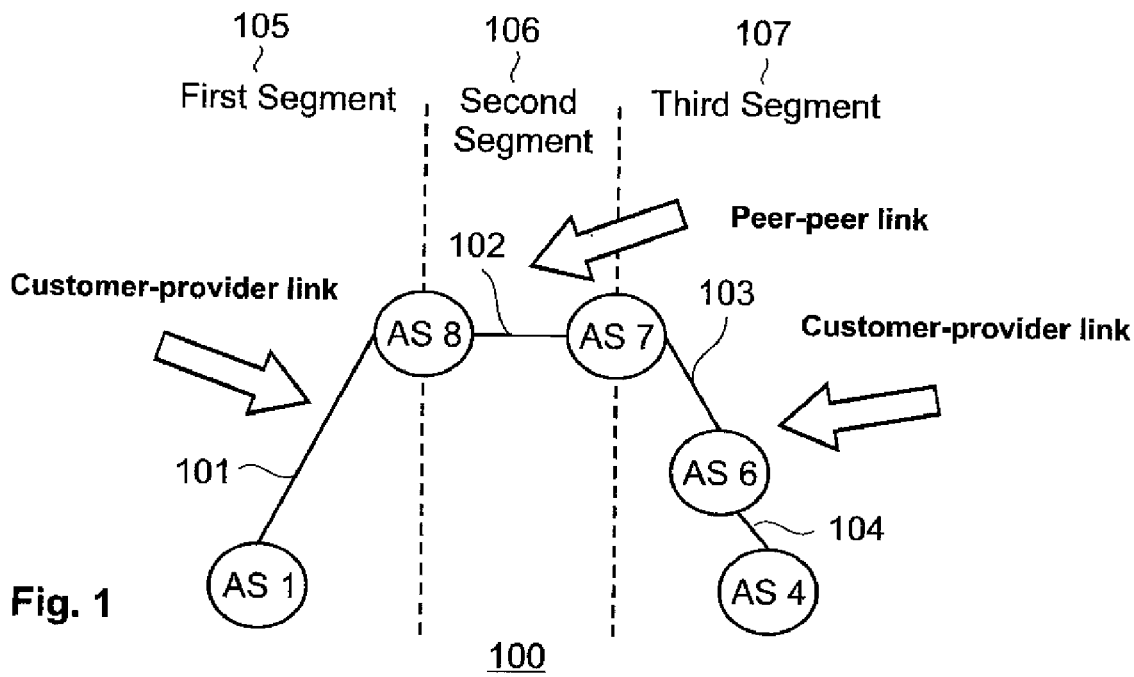
FIG. 1 shows an example of the valley-free routing path.

FIG. 1 shows an example of a valley-free path 100 comprising five autonomous systems (ASx)—also called nodes in the following—interconnected by four links, the system being divided into three segments 105, 106, 107. The first segment 105 includes one customer-to-provider link 101, the second segment 106 includes a peer-to-peer link 10), and the third segment 107 includes two customer-to-provider links 103,104.

The first segment 105 is an uphill segment and corresponds to a customer-to-provider link 101 between AS1 and AS8, wherein AS1 is a customer of provider AS8. According to the valley free routing model, a first uphill segment may be followed by more customer-to-provider links or by one peer-to-peer link. The second segment 106 is a peer-to-peer link between AS8 and AS7. The valley-free routing model states that no further peer-to-peer link may be connected to a first peer-to-peer link. The third segment 107 is a provider-to-customer link, as represented between the nodes AS7 and AS6. The routing model allows further provider-to-customer links, as represented in FIG. 1 between the link AS6 and AS4.

Figure 2:
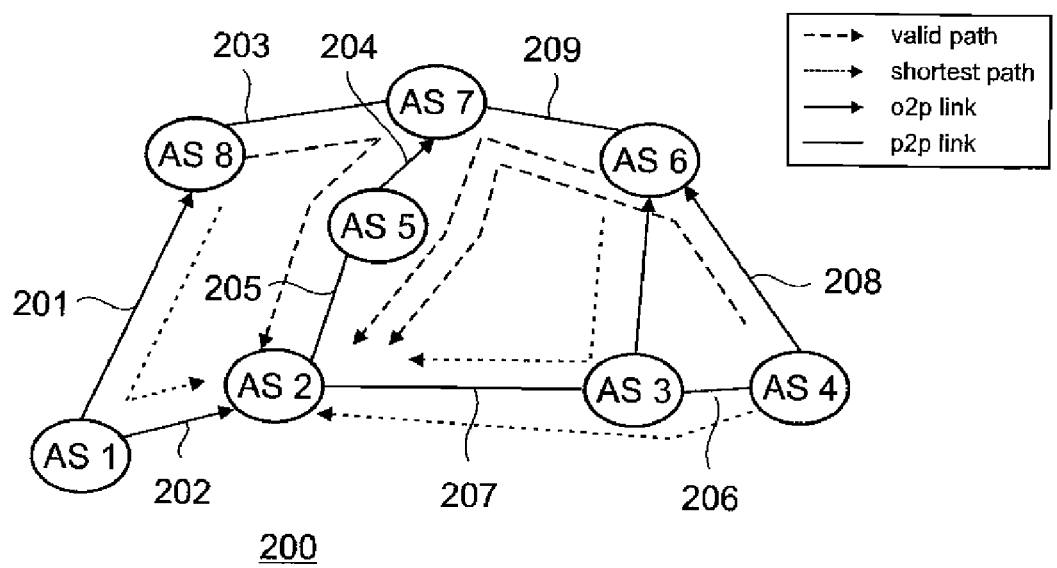
FIG. 2 shows an autonomous system topology.

FIG. 2 shows by way of an example the difference between a conventional shortest-path approach between two autonomous systems and a valid path according to the valley-free routing model within an AS topology 200. FIG. 2 includes eight autonomous systems ASx and ten interconnections 201 ... 209, also called links. Each interconnection 201 ... 209 is either a customer-to-provider link (o2p) or a peer-to-peer link (p2p). A o2p link is represented by an arrow, and a p2p link is represented by a line.

If for example the node AS8 is the source node and the node AS2 is the destination node, the shortest-path in the conventional approach runs via AS1 to AS2. According to the valley-free routing model, if AS8 is a provider of customer AS1, then the path AS8→AS1 corresponds to a downhill segment, which can only be followed by further downhill segments. As AS1 is a customer of provider AS2, the path from AS1→AS2 is an uphill segment, and the path AS8→AS1→AS2 is not allowed, as it generates a valley. As a consequence, the shortest valley-free path in this first example starts with a peer-to-peer link 203 from AS8→AS7, followed by two provider-to-customer links from AS7 to AS5 and from AS5 to AS2, as both are downhill segments.

In a second example, if AS4 is the starting/source node, and AS2 is the destination node, then the shortest path in a conventional approach not respecting the valley-free paradigm would be a path through the peer-to-peer link 206 from AS4→AS3, followed by a second peer-to-peer link 207 from AS3→AS2. As the valley-free routing model states that a peer-to-peer link must be followed by a downhill segment of zero or more provider-to-customer or sibling-to-sibling links, then the routing between AS3→AS2 is not allowed. The shortest valley-free path starts with the uphill customer-to-provider link 208 from AS4→AS6, followed by a peer-to-peer 209 from AS6→AS7. A downhill segment on links 205 and 205 allow reaching the destination AS2.

Figure 3:
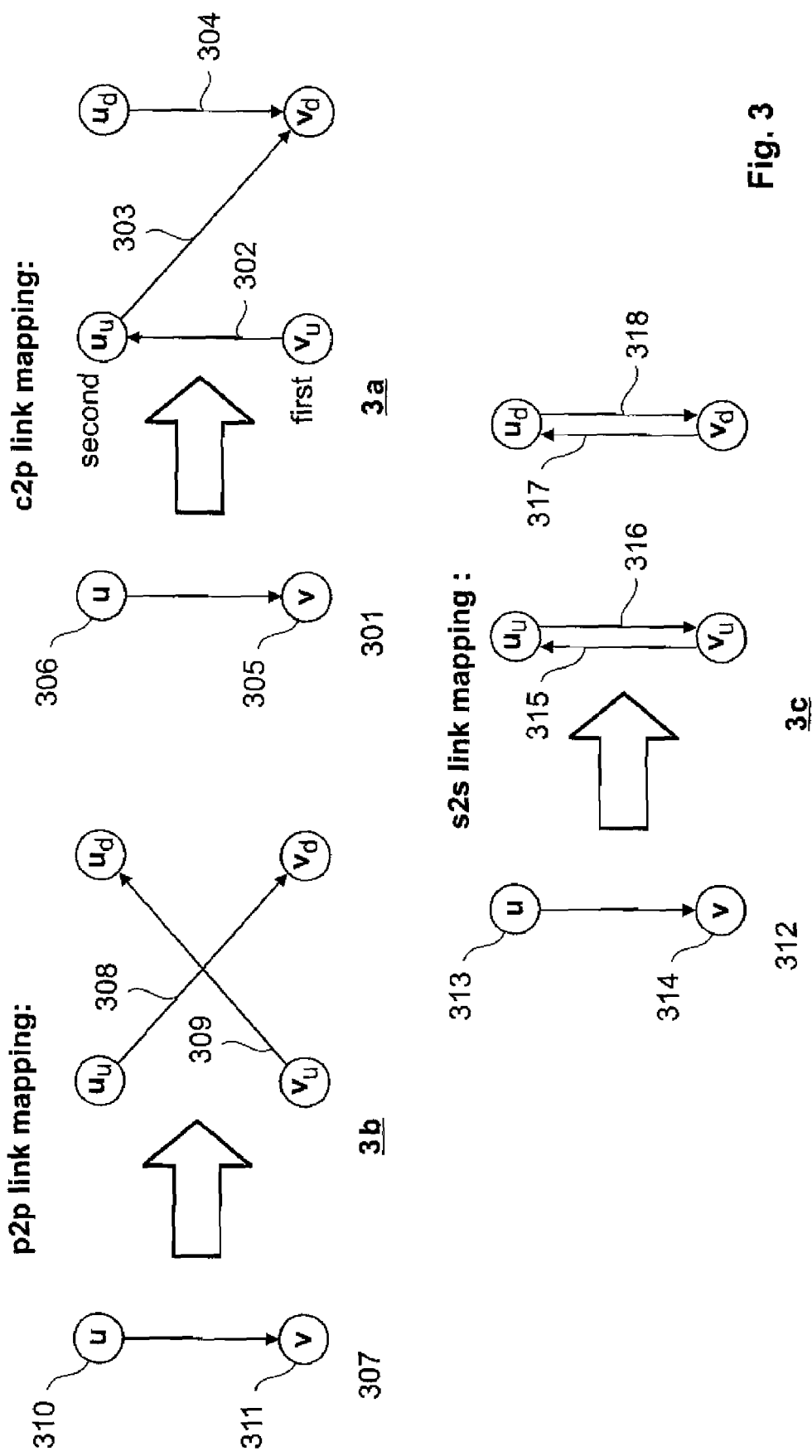
FIG. 3 shows a mapping process applied to three types of relationships according to an embodiment of the invention.

FIG. 3 shows a mapping process applied to three different relationship types: a customer-to-provider link mapping according to FIG. 3a, a peer-to-peer link mapping according to FIG. 3b and a sibling-to-sibling link mapping according to FIG. 3c.

The links 301, 307 and 312 between respective nodes are mapped into a second representation—also call graph—including uphill and downhill nodes and directed between such nodes the directed links following a scheme as explained below in order to describe the relationship types. Uphill and downhill nodes are simply referred to as terms for describing the nodes in the second graph.

The first step in the mapping process is to map each node of the first graph into an uphill node and a downhill node in the second graph. FIG. 3 shows how each node U of the first graph (i.e. throughout FIG. 3 the graph on the left hand side of the big arrow) is mapped into a node $U_u$ representing an uphill node, and node $U_d$ representing a downhill node in the second graph (i.e. throughout FIG. 3 the graph on the right hand side of the big arrow). Analogously, the node V of the first graph is mapped into a node $V_u$ as the uphill node and node $V_d$ as the downhill node of the second graph. Nodes U and V are also called in this context first and second node. The first mapping step occurs independently of the relationship type or the links that the nodes are assigned to.

With respect to the first relationship type 3a, the customer-to-provider (c2p) link 301 is mapped into three directed links 302-304 connecting the uphill and downhill nodes. If the node 305 is a customer of the node 306, wherein the node 306 is the provider of the node 305, then the connections of the directed links are connected as: A first directed link 302 goes from $V_u$ or the uphill customer node to $U_u$ or uphill provider node; a second directed link 303 starts on uphill customer node $U_u$ to the downhill customer node $V_d$. A third directed link 304 goes from the downhill provider node $U_d$ to downhill customer node $V_d$.

The directed links of the customer-to-provider link of 301 represent the allowable restrictions of this type of link, where a downhill segment may only be followed by further downhill segments. If for example the route path starts at a customer node 305 of a provider 306, then the destination is also an uphill segment, represented by uphill node $U_u$. This may be linked to further customer-to-provider relationships.

Otherwise, if the route path starts at a provider node 306 of a customer node 305, and the route is coming from the uphill segment, represented by the uphill node $U_u$, the destination can only be to a downhill segment, represented by a downhill node $V_d$. In the third case, if the flow path is already in the downhill segment, then the path stays on that downhill segment. This is represented in the direct link 304 coming from a downhill provider $U_d$ to a downhill customer $V_d$. These three directed links 302-304 represent all possible transitions of the customer-to-provider relationship and are provided in combination as a result of the mapping process.

On the second relationship type 3b, the peer-to-peer link 307 uses two directed links 308-309 to represent the restrictions of this type of relationship. As the valley-free routing model uses a segment of zero or one peer-to-peer link, the two directed links start on the uphill node of the peers and end up in the downhill node of both peers. This is represented in the first graph by first and second node 310 and 311. This transition, from the uphill and to the downhill nodes, assures that the peer-to-peer restrictedly comes from an uphill segment and is followed by a downhill segment.

With respect to the mapping of the third relationship type 3c which concerns a sibling-to-sibling link 312, the uphill nodes of both sibling nodes $U_u$ and $V_u$ are linked with directed links in both directions 315, 316. In an analogous way, the corresponding downhill nodes $U_d$ and $V_d$ are linked with two direct links 317 and 318, also in both directions. The four directed links 315-318 represent the traffic exchange between sibling-to-sibling autonomous systems, where packets flow in any direction without routing restrictions. As a consequence, routing through a sibling-to-sibling link keeps the routing path in the segment where it previously was. If for example the route taken is on the uphill segment, after the sibling-to-sibling link it will stay on the uphill segment. As a general rule of the mapping of the three relationship types, the downhill nodes are restricted to transition to other downhill nodes, and the uphill nodes may transition to both uphill and downhill nodes.

Figure 4:
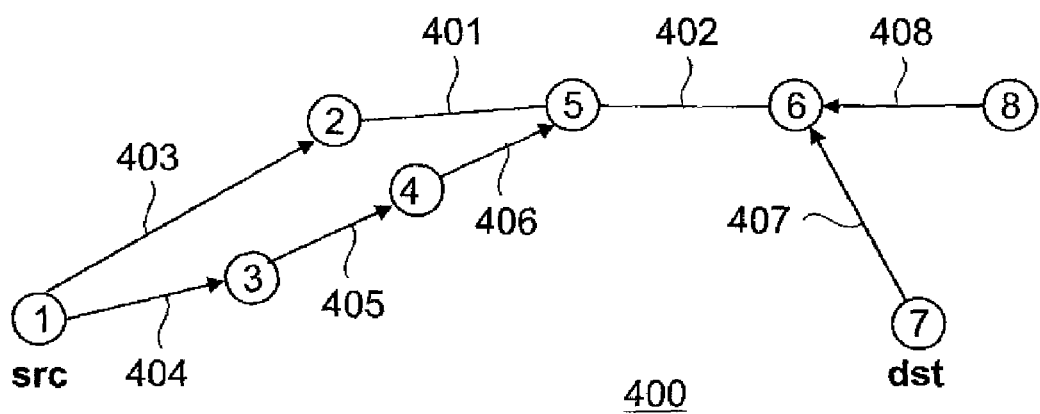
FIG. 4 shows a first autonomous system graph.

FIG. 4 shows a first graph 400 of an autonomous system topology, including eight autonomous systems 1-8 and eight interconnections/links 401-408. The links with arrows indicate customer-to-provider links 403-407, double arrows indicate a sibling-to-sibling link 408, and a line indicates peer-to-peer link 401-402.

The FIG. 4 sample topology may be used to analyze a shortest path calculation without a mapping process, where all transitions between autonomous systems are considered to be allowed. For example, a shortest path calculation after traversing the path from the node 1→node 2→node 5, will keep iterating from the nodes 5→6, since all transitions are considered to be allowed. As it is known from the valley-free routing model, a peer-to-peer relationship as 401 must be followed by a provider-to-customer relationship or sibling-to-sibling relationship. As the link 402 from node 5→node 6 is a peer-to-peer relationship, the path node 1→node 2→node 5→node 6 would violate the valley-free routing model. As first graph 400 as presented in FIG. 4 is used as an input to be mapped into a second graph 500.

Figure 5:
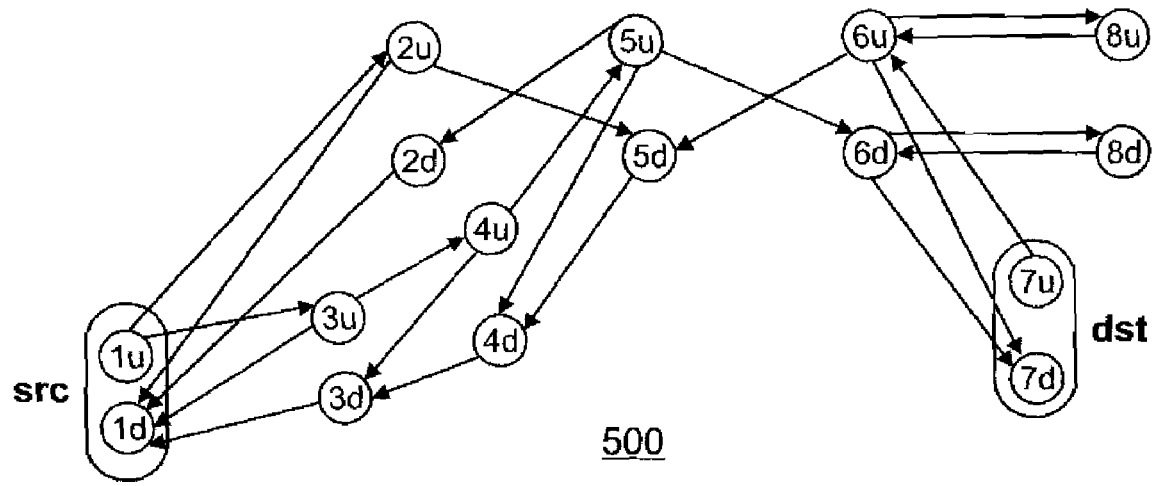
FIG. 5 shows a second graph generated from a first graph in accordance with an embodiment of the invention.

FIG. 5 shows a second graph 500 as a result of a mapping process using the first graph 400 of FIG. 4 as input. FIG. 5 includes eight uphill nodes 1u ... 8u and eight downhill nodes 1d ... 8d, and a plurality of directed links indicating allowable path transitions according to the valley-free paradigm. Each relationship type has been mapped into direct links according to the mechanisms as laid out in FIG. 3.

After the mapping process is finalized, a conventional shortest path method can be used to calculate the shortest path between any source and destination node in FIG. 5 without any further information regarding the relationship types between the nodes. If the starting node is e.g. node 1 and the destination node is e.g. node 7, an analysis of the directed links shows that, if the path from node 1u→node 2u→node 5d is taken the node 5d can not take any other route, becoming an invalid path. If a second path is taken from 1u→3u→4u→5u, then the route taken will follow an uphill segment, the path will reach the node 5u and will be allowed to traverse to node 6d using the peer-to-peer link. Beyond node 6d, the path is on the downhill segment and may take the provider-to-customer link to node 7d using and reach the final destination. A final de-mapping process may convert the shortest path 1u→3u→4u→5u→6d→7d as calculated in the second graph 500 back into the node syntax of the first graph, i.e. 1→3→4→5→6→7, by simply re-mapping the uphill and downhill nodes into their origins in the first graph 400.

For the topology as laid out in FIG. 4, the graph according to FIG. 5 describes the graphical representation of all restrictions from the valley-free routing model, so that any classical shortest route path calculation may be used to obtain the valley-free shortest path. The information of the relationship types is intrinsically described in the arrangement and the number of directed links between the uphill and downhill nodes. Then, it only requires using a classical shortest path calculation such as the Dijkstra algorithm or the Floyd-Warshall algorithm.

Figure 6:
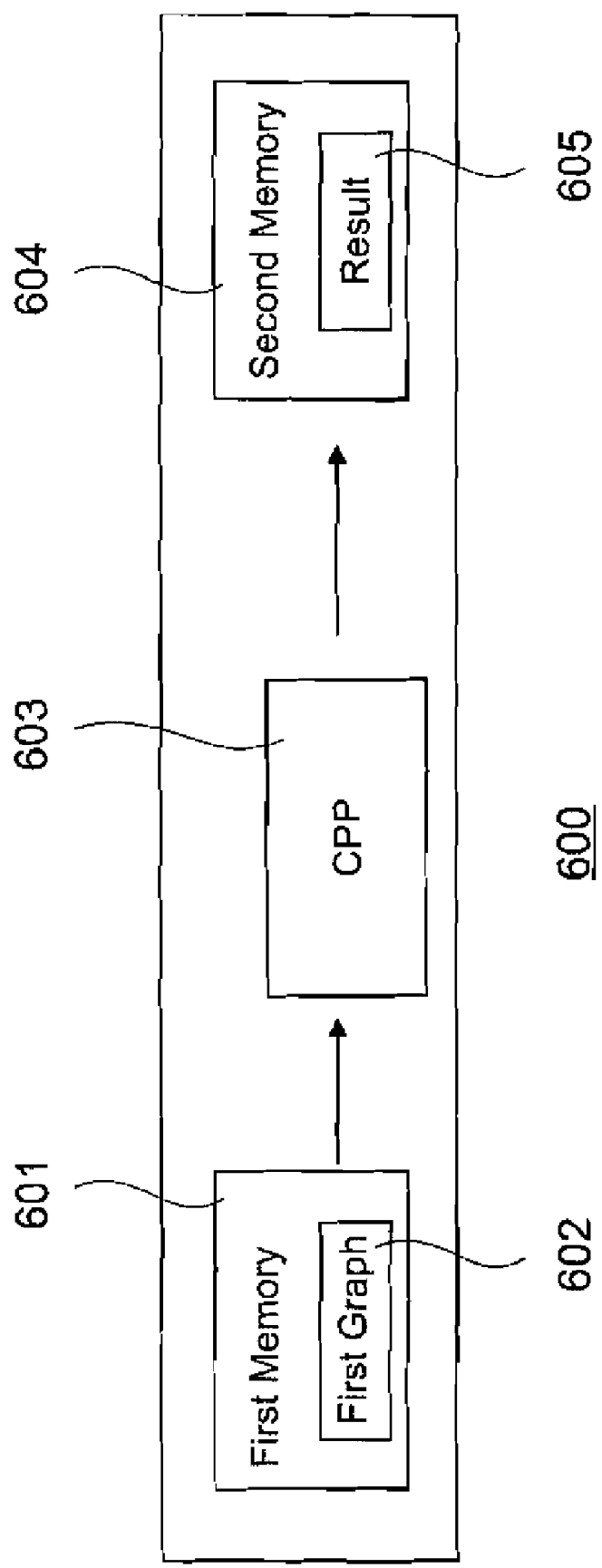
FIG. 6 shows a block diagram of a data processing apparatus in accordance with an embodiment of the invention.

FIG. 6 shows a block diagram illustrating an embodiment of a data processing apparatus implementing the valley-free shortest path calculation. The block diagram includes an apparatus 600, containing a first memory 601, a first graph 602 being stored in the first memory 601. The apparatus further comprises a first computer program element 603 and a second memory 604 comprising a result 605 of the calculation. The first graph 602 represents an autonomous system topology and contains a plurality of nodes, a plurality of links between the nodes, and a relationship type for each interconnection.

The computer program element 603 generates a second graph using the first graph 602, by mapping the nodes of the first graph into the second graph, by representing each node of the first graph by a respective uphill node and a downhill node. The computer program product also maps each link using directed links according to the type or relationship. The relationship may be a first, second and third type, corresponding to a customer-to-provider, a peer-to-peer, and a sibling-to-sibling relationship. In a last step, the computer program element 603 calculates a shortest-path route between a first and a destination autonomous system in the second graph, using a shortest-path routing algorithm. The result 605 of the calculation may be stored in a second memory 604.

The algorithm used for the shortest-path route may be for example Dijkstra algorithm or a Floyd-Warshall algorithm. Alternatively, a second computer program element may receive the second graph and proceed to calculate the shortest-path route.

The calculation of the shortest route path between any two autonomous systems may be useful to analyze, for example, a new interconnection to an AS, or the upgrade of an existing relationship. The upgrade may be, for example, from a customer-to-provider to a peer-to-peer relationship. An Internet Service Provider (ISP) may analyze the impact of the new interconnection or the upgrade on the routing flow, and in particular in ASes that host critical resources.

If, for example, an ISP plans to add one or more new interconnections to the AS topology, it may use the valley-free routing calculation to compute the shortest valley-free paths from an AS to the ASes that host critical resources. This process yields a list of new AS paths that may be used for reaching critical destinations after the new interconnection comes into effect.

Further, the ISP may verify if these new paths differ from the used paths. The ISP further analyzes: how the path changes are going to affect its internal routing to exit points, how the new internal routing is going to affect the utilization of the internal network resources, and the quality of the new paths. This information describes the advantages and disadvantages of using the new or the old paths for reaching the critical destinations. If the new paths improve the service that the ISP offers to its customers, the ISP may consider establishing the new interconnection.

The invention claimed is:

1. A method of determining a shortest path for routing data packets between a source autonomous system (src) represented by one node in a first graph and a destination autonomous system (dst) represented by another node in a first graph, the first graph representing an autonomous system topology and comprising a plurality of nodes and a plurality of links, each link linking a first and a second node of the plurality of nodes, the nodes representing autonomous systems and the links representing relationship types, the relationship type being one of: a first, a second or a third type, the method comprising the steps of:

generating a second graph using the first graph by:
(a) mapping each node of the first graph to an uphill node and a downhill node in the second graph,
(b) for each link of the first relationship type between a first node and a second node in the first graph, mapping the link to: a directed link from the first uphill node to the second uphill node, a directed link from the second uphill node to the first downhill node, and a directed link from the second downhill node to the first downhill node,
(c) for each link of the second relationship type, between a first node and a second node in the first graph, mapping the link to: a directed link from the first uphill node to the second downhill node, and a directed link from the second uphill node to the first downhill node,
(d) for each link of the third relationship type, between a first node and a second node in the first graph, mapping the link to: a directed link from the first uphill node to the second uphill node, a directed link from the second uphill node to the first uphill node, a directed link from the first downhill node to the second downhill node, and a directed link from the second downhill node to the first downhill node, wherein the first uphill node and the first downhill node in the second graph represent the first node in the first graph, and the second uphill node and the second downhill node in the second graph represent the second node in the first graph, determining a shortest-path route between the source (src) and the destination autonomous system (dst) in the second graph, using a shortest-path routing algorithm.

2. A method according to claim 1, wherein the first relationship type represents a customer-to-provider relationship between the associated nodes, wherein the second relationship type represents a provider-to-provider relationship between the associated nodes, and wherein the third relationship type represents a sibling-to-sibling relationship between the associated nodes.

3. A method according to claim 1, wherein each node provides one or more relationship types with other nodes.

4. A method according to claim 1, wherein a directed link in a relationship type indicates an allowable transition between the associated nodes.

5. A method as in claim 4, wherein the shortest path between the source (src) and the destination autonomous system (dst) is determined in a valley-free way.

6. A method according to claim 1, wherein a result of the determination of the shortest-path routing algorithm in the second graph is de-mapped into the first graph.

7. A method according to claim 1, wherein downhill nodes of the second graph have directed links only to other downhill nodes of the second graphs.

8. A method according to claim 1, wherein as the shortest-path routing algorithm one of a Dijkstra algorithm and a Floyd-Warshall algorithm is used.

9. A method according to claim 1, further comprising evaluating Internet traffic between the source and the destination autonomous system (src, dst) after a modification of the autonomous system topology and/or the relationship types between the autonomous systems.

10. A computer program element comprising computer readable program stored on a non-transitory computer usable medium for causing a computer to perform a method of determining a shortest path for routing data packets between a source autonomous system (src) represented by a node in a first graph and a destination autonomous system (dst) represented by another node in a first graph, the first graph representing an autonomous system topology and comprising a plurality of nodes and a plurality of links, each link linking a first and a second node of the plurality of nodes, the nodes representing autonomous systems and the links representing relationship types, the relationship type being one of: a first, a second or a third type when said program element is run on a computer, said method comprising the steps of:

generating a second graph using the first graph by:
(a) mapping each node of the first graph to an uphill node and a downhill node in the second graph,
(b) for each link of the first relationship type between a first node and a second node in the first graph, mapping the link to: a directed link from the first uphill node to the second uphill node, a directed link from the second uphill node to the first downhill node, and a directed link from the second downhill node to the first downhill node,
(c) for each link of the second relationship type, between a first node and a second node in the first graph, mapping the link to: a directed link from the first uphill node to the second downhill node, and a directed link from the second uphill node to the first downhill node,
(d) for each link of the third relationship type, between a first node and a second node in the first graph, mapping the link to: a directed link from the first uphill node to the second uphill node, a directed link from the second uphill node to the first uphill node, a directed link from the first downhill node to the second downhill node, and a directed link from the second downhill node to the first downhill node,
wherein the first uphill node and the first downhill node in the second graph represent the first node in the first graph, and the second uphill node and the second downhill node in the second graph represent the second node in the first graph,
determining a shortest-path route between the source (src) and the destination autonomous system (dst) in the second graph, using a shortest-path routing algorithm.

11. A data processing apparatus for determining a shortest path for routing data packets between a source (src) autonomous system represented by a node in a first graph and a destination autonomous system (dst) represented by another node in the first graph, comprising:
at least one processor,
storage means for storing a first graph, the first graph representing an autonomous system topology and comprising a plurality of nodes and a plurality of links, each link linking a first and a second node of the plurality of nodes, the nodes representing autonomous systems and the links representing relationship types, the relationship type being one of: a first, second or third type,
at least one graph generating means for:
(I) generating a second graph using the first graph by:
(a) mapping each node of the first graph to an uphill node and a downhill node in the second graph,
(b) for each link of the first relationship type between a first node and a second node in the first graph, mapping the link to: a directed link from the first uphill node to the second uphill node, a directed link from the second uphill node to the first downhill node, and a directed link from the second downhill node to the first downhill node,
(c) for each link of the second relationship type between a first node and a second node in the first graph, mapping the link to: a directed link from the first uphill node to the second downhill node, and a directed link from the second uphill node to the first downhill node,
(d) for each link of the third relationship type between a first node and a second node in the first graph, mapping the link to: a directed link from the first uphill node to the second uphill node, a directed link from the second uphill node to the first uphill node, a directed link from the first downhill node to the second downhill node, and a directed link from the second downhill node to the first downhill node,
wherein the first uphill node and the first downhill node in the second graph represent the first node in the first graph, and the second uphill node and the second downhill node in the second graph represent the second node in the first graph, and
route determining means for determining a shortest-path route between the source (src) and the destination autonomous system (dst) in the second graph, using a shortest-path routing algorithm.

* * * * *